(12) United States Patent
Cho et al.

(10) Patent No.: US 11,502,709 B2
(45) Date of Patent: Nov. 15, 2022

(54) DUAL-BAND SIGNAL BOOSTER FOR PUBLIC SAFETY RADIO NETWORK

(71) Applicant: Innertron, Inc., Incheon (KR)

(72) Inventors: Hak Rae Cho, Incheon (KR); Chang Hyun Lee, Incheon (KR); Hyu Jin Jung, Incheon (KR)

(73) Assignee: INNERTRON, INC., Incheon (KR)

( * ) Notice: Subject to any disclaimer, the term of this patent is extended or adjusted under 35 U.S.C. 154(b) by 0 days.

(21) Appl. No.: 17/411,239

(22) Filed: Aug. 25, 2021

(65) Prior Publication Data
US 2022/0329272 A1 Oct. 13, 2022

(30) Foreign Application Priority Data
Apr. 7, 2021 (KR) ........................ 10-2021-0045414

(51) Int. Cl.
| | |
|---|---|
| *H04B 1/04* | (2006.01) |
| *H04B 7/15* | (2006.01) |
| *H04B 1/44* | (2006.01) |
| *H04B 1/00* | (2006.01) |
| *H04B 7/26* | (2006.01) |
| *H04W 88/04* | (2009.01) |
| *H04W 16/14* | (2009.01) |

(52) U.S. Cl.
CPC ... *H04B 1/0475* (2013.01); *H04B 2001/0416* (2013.01)

(58) Field of Classification Search
None
See application file for complete search history.

(56) References Cited

U.S. PATENT DOCUMENTS

| | | | |
|---|---|---|---|
| 11,038,542 B2* | 6/2021 | Anderson | H04B 1/04 |
| 11,233,492 B2* | 1/2022 | Ashworth | H04W 16/26 |
| 11,265,075 B2* | 3/2022 | Zhan | H04B 7/15507 |
| 11,349,556 B2* | 5/2022 | Zhan | H04W 16/14 |
| 11,418,251 B2* | 8/2022 | Ashworth | H04B 1/0053 |

* cited by examiner

*Primary Examiner* — Pablo N Tran
(74) *Attorney, Agent, or Firm* — Lex IP Meister, PLLC

(57) ABSTRACT

This embodiment discloses a dual-band signal booster for a public safety radio network. The signal booster disclosed herein performs a low-noise amplification and a frequency down/up conversion on a radio frequency signal received from a donor antenna, amplifies the amplified and converted signal to a high-power level, and transmits the amplified signal to a service antenna. Further, the signal booster disclosed herein performs the low-noise amplification and the frequency down/up conversion on a radio frequency signal received from the service antenna, amplifies the amplified and converted signal to a high-power level, and transmits the amplified signal to the donor antenna. According to this embodiment, it is possible to simultaneously service a plurality of channels to increase a communication capacity. Further, it is possible to variably set a class, frequency and bandwidth of each channel as needed, which makes it possible to provide communication qualities optimized according to installation field conditions.

5 Claims, 6 Drawing Sheets

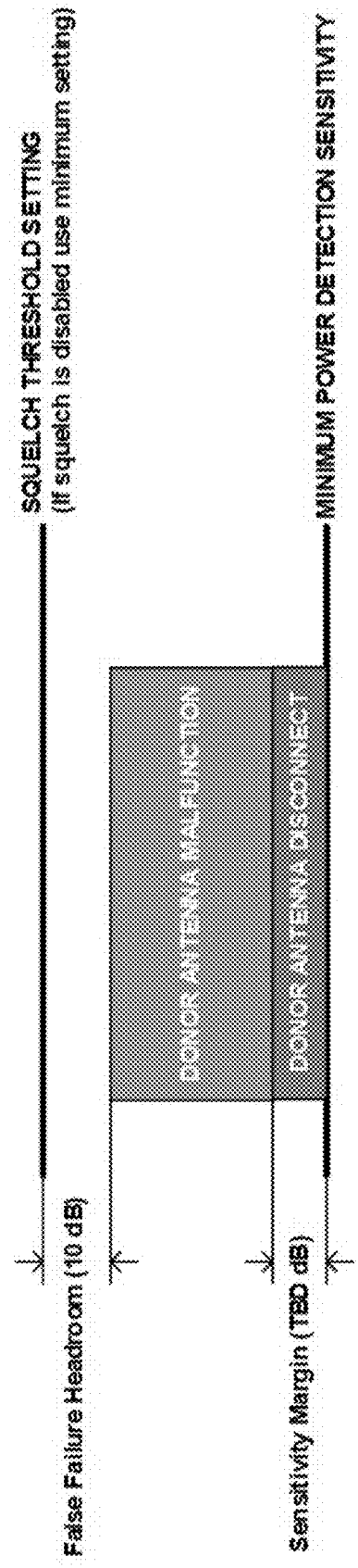

DUAL-BAND SIGNAL BOOSTER FOR PUBLIC SAFETY RADIO NETWORK

CROSS-REFERENCE TO RELATED APPLICATION

This application claims priority to and the benefit of Korean Patent Application No. 10-2021-0045414 filed in the Korean Intellectual Property Office on Apr. 7, 2021, the entire contents of which are incorporated herein by reference.

TECHNICAL FIELD

The present invention relates to a signal booster that enables a terminal inside a building where radio communication becomes difficult to communicate with an external terminal wirelessly, and more particularly, to a dual-band signal booster for public safety radio network.

BACKGROUND

In general, it tends to be difficult for an external radio signal to directly reach the interior of a building or subway. Thus, radio communication with a terminal inside a building or subway is difficult. Therefore, in preparation for the case in which an emergency such as fire or the like occurs inside the building where the radio communication becomes difficult, there is a need to establish a public safety radio network for communicating with an external emergency control center.

The public safety radio network or disaster safety communication network is an emergency communication network for protecting and rescuing people when an emergency such as fire occurs in a large building or structure, a subway, a ship, or the like. The building owners are obliged to install an emergency radio responder communication system (ERRCS) in the building.

It is very important that a signal booster used in such a public safety radio network has high reliability such that it can operate normally even in poor environments.

SUMMARY

The present invention is made in view of the above problems, and the object of the present invention is to provide a dual-band signal booster for public safety radio networks that a monitoring function is improved to enhance reliability and which can simultaneously service within a plurality of frequency bands and the bandwidth and frequency of each channel can be customized according to field conditions.

Embodiments of the present invention disclose a dual-band signal booster for public safety radio network.

A dual-band signal booster for a public safety radio network disclosed herein includes: a donor-antenna-side triplexer configured to separate and transmit a first band of radio frequency (RF) signal and a second band of radio frequency signal, which are received from a donor antenna, to a service antenna, and configured to transmit a combined radio frequency signal, which is obtained by combining the first band of radio frequency signal with the second band of radio frequency signal, to the donor antenna; a first band low-noise amplifier configured to amplify the first band of radio frequency signal received from the donor-antenna-side triplexer to a first low-noise level; a second band low-noise amplifier configured to amplify the second band of radio frequency signal received from the donor-antenna-side triplexer to a second low-noise level; a first band input level limiting means configured to limit an analog level of the first band of radio frequency signal input from the first band low-noise amplifier; a second band input level limiting means configured to limit an analog level of the second band of radio frequency signal input from the second band low-noise amplifier; a first band down-converter configured to receive, as an input, the first band of radio frequency signal having the limited analog level from the first band input level limiting means, and convert the same into a first intermediate frequency signal; a second band down-converter configured to receive, as an input, the second band of radio frequency signal having the limited analog level from the second band input level limiting means, and convert the same into a second intermediate frequency signal; a first digital filtering part configured to digitally filter the first intermediate frequency signal from the first band down-converter to a first preset class of channel; a second digital filtering part configured to digitally filter the second intermediate frequency signal from the second band down-converter to a second preset class of channel; a first band up-converter configured to convert the digitally-filtered first intermediate frequency signal into the first band of radio frequency signal; a second band up-converter configured to convert the digitally-filtered second intermediate frequency signal into the second band of radio frequency signal; a first band high-power amplifier configured to amplify the first band of radio frequency signal whose frequency is up-converted to a first high-power level; a second band high-power amplifier configured to amplify the second band of radio frequency signal whose frequency is up-converted to a second high-power level; a service-antenna-side triplexer configured to transmit the first band of radio frequency signal input from the first band high-power amplifier and the second band of radio frequency signal input from the second band high-power amplifier to the service antenna, and configured to receive the combined radio frequency signal from the service antenna; a common low-noise amplifier configured to amplify the combined radio frequency signal received from the service-antenna-side triplexer to a low-noise level; an uplink distributor configured to separately distribute the combined radio frequency signal, which is amplified to the low-noise level by the common low-noise amplifier, into the first band of radio frequency signal and the second band of radio frequency signal; a first band down-converter configured to down-convert the first band of radio frequency signal distributed from the uplink distributor to the first intermediate frequency signal; a second band down-converter configured to down-convert the second band of radio frequency signal distributed from the uplink distributor to the second intermediate frequency signal; a third digital filtering part configured to digitally filter the first intermediate frequency signal from the first band down-converter into the first set class of channel; a fourth digital filtering part configured to digitally filter the second intermediate frequency signal from the second band down-converter into the second set class of channel; a first band up-converter configured to convert the digitally-filtered first intermediate frequency signal into the first band of radio frequency signal; a second band up-converter configured to convert the digitally-filtered second intermediate frequency signal into the second band of radio frequency signal; an uplink combiner configured to combine the first band of radio frequency signal and the second band of radio frequency signal whose frequencies are up-converted; and a common high-power amplifier configured to amplify the combined radio frequency signal combined at the uplink combiner to a high-power level.

According to embodiments of the present invention, a dual-band signal booster used in a public safety radio network for rescuing people at the time of disaster turns off a channel when no signal is input into the channel, which makes it possible to reduce unnecessary consumption of electric power. Further, the dual-band signal booster can issue various types of alarms according to detection levels indicating that a donor antenna is malfunctioned, the donor antenna is disconnected from the signal booster, and the like, thereby operators can rapidly react to such abnormal situations. This makes it possible to enhance the reliability of the public safety radio network.

Further, according to embodiments of the present invention, it is possible to simultaneously service in a plurality of bands to increase a communication capacity.

Further, operators can variably set a class, frequency and bandwidth of each channel as needed, which makes it possible to provide communication qualities optimized according to installation field conditions.

BRIEF DESCRIPTION OF THE DRAWINGS

FIG. 9 depicts an example of a malfunction detection level according to an embodiment of the present invention.

DETAILED DESCRIPTION

The present invention and technical problems solved by the present invention will become more apparent by the preferred embodiments of the present invention which will be described herein after. The following embodiments are only examples to explain the present invention, and are not intended to limit the scope of the present invention.

Figure 1:
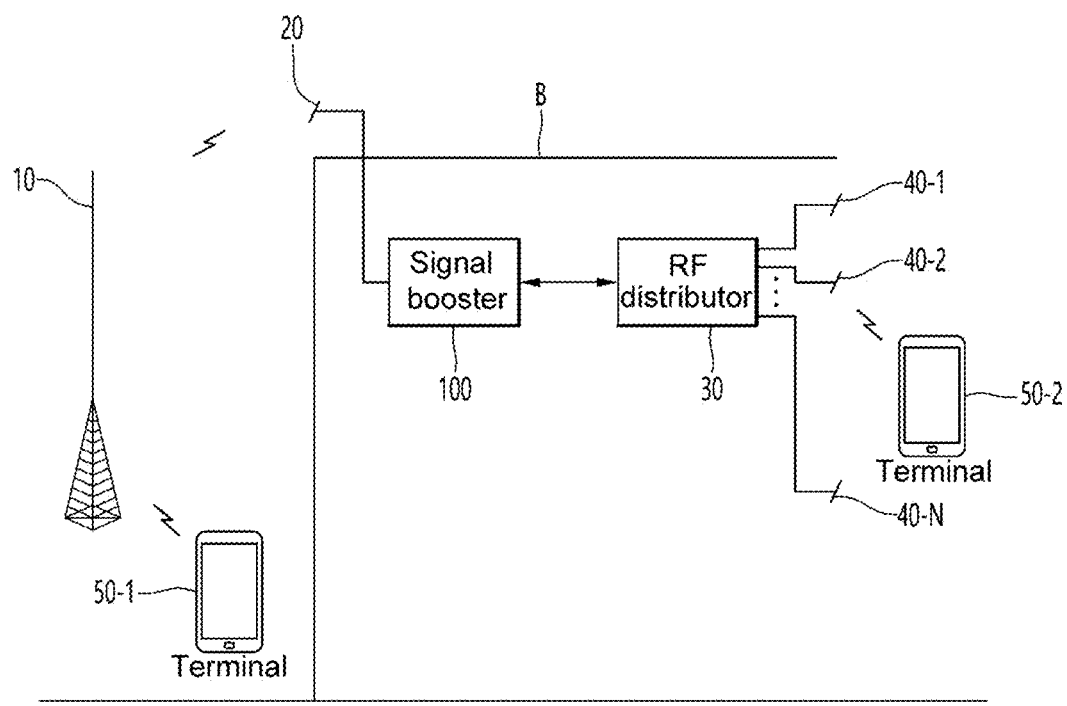
FIG. 1 depicts a schematic drawing illustrating an overall configuration of a public safety radio network to which the present invention is applicable.

FIG. 1 depicts a schematic drawing illustrating an overall configuration of a public safety radio network to which the present invention is applicable.

As illustrated in FIG. 1, the public safety radio network to which the present invention is applicable can include a local public safety tower 10 equipped with a first responder antenna that is provided outside of a building B, a donor antenna 20 installed on the roof, the rooftop, or the like of the building B and having a directivity to the local public safety tower 10, a dual-band signal booster 100 according to the present invention, a radio frequency (RF) distributor 30, and a plurality of service antennas 40-1 to 40-N dispersedly installed on each floor of the building B.

Referring to FIG. 1, the donor antenna 20 is a directional antenna which is installed on the roof or the like of the building B to be able to communicate with the external local public safety tower 10. The dual-band signal booster 100 performs a low-noise amplification and frequency up-down conversion on a radio signal received from the donor antenna 20, amplifies the signal to a high-power level, and then transmits the signal to the plurality of service antennas 40-1 to 40-N. Further, the dual-band signal booster 100 performs a low-noise amplification and frequency up-down conversion on radio signals received from the plurality of service antennas 40-1 to 40-N, amplifies the signals to a high-power level, and then transmits the signals to the donor antenna 20. The RF distributor 30 distributes a radio signal from the dual-band signal booster 100 to the plurality of service antennas 40-1 to 40-N. Further, the RF distributor 30 combines radio signals received from the plurality of service antennas 40-1 to 40-N and transmits the same to the dual-band signal booster 100. The plurality of service antennas 40-1 to 40-N are a distributed antenna system (DAS) composed of omnidirectional antennas that are dispersedly installed in each floor of the building B, and form wireless links with respect to a wireless terminal 50-2 located inside the building B. Thus, the wireless terminal 50-2 is able to communicate with a terminal 50-1 located in an emergency control center or an emergency controller through the local public safety tower 10 located outside the building B.

In an embodiment of the present invention, a transmission path from the donor antenna 20 to the plurality of service antennas 40-1 to 40-N will be referred to as a downlink (DL), and a transmission path from the plurality of service antennas 40-1 to 40-N to the donor antenna 20 will be referred to as an uplink (UL). The dual-band signal booster 100 according to an embodiment of the present invention is configured to be capable of servicing two different frequency bands simultaneously. In an embodiment of the present invention, a first band A is a band having a frequency in a 700 MHz range and a second band B is a band having a frequency in a 800 MHz range. More specifically, a downlink frequency of the first band A is in a range of 758 to 776 MHz, and an uplink frequency thereof is in a range of 788 to 806 MHz. A downlink frequency of the second band B is in a range of 851 to 869 MHz, and an uplink frequency thereof is in a range of 806 to 824 MHz. These frequency bands are merely examples for the convenience of understanding. The present embodiments described here may also be applicable to other frequency bands.

Figure 2:
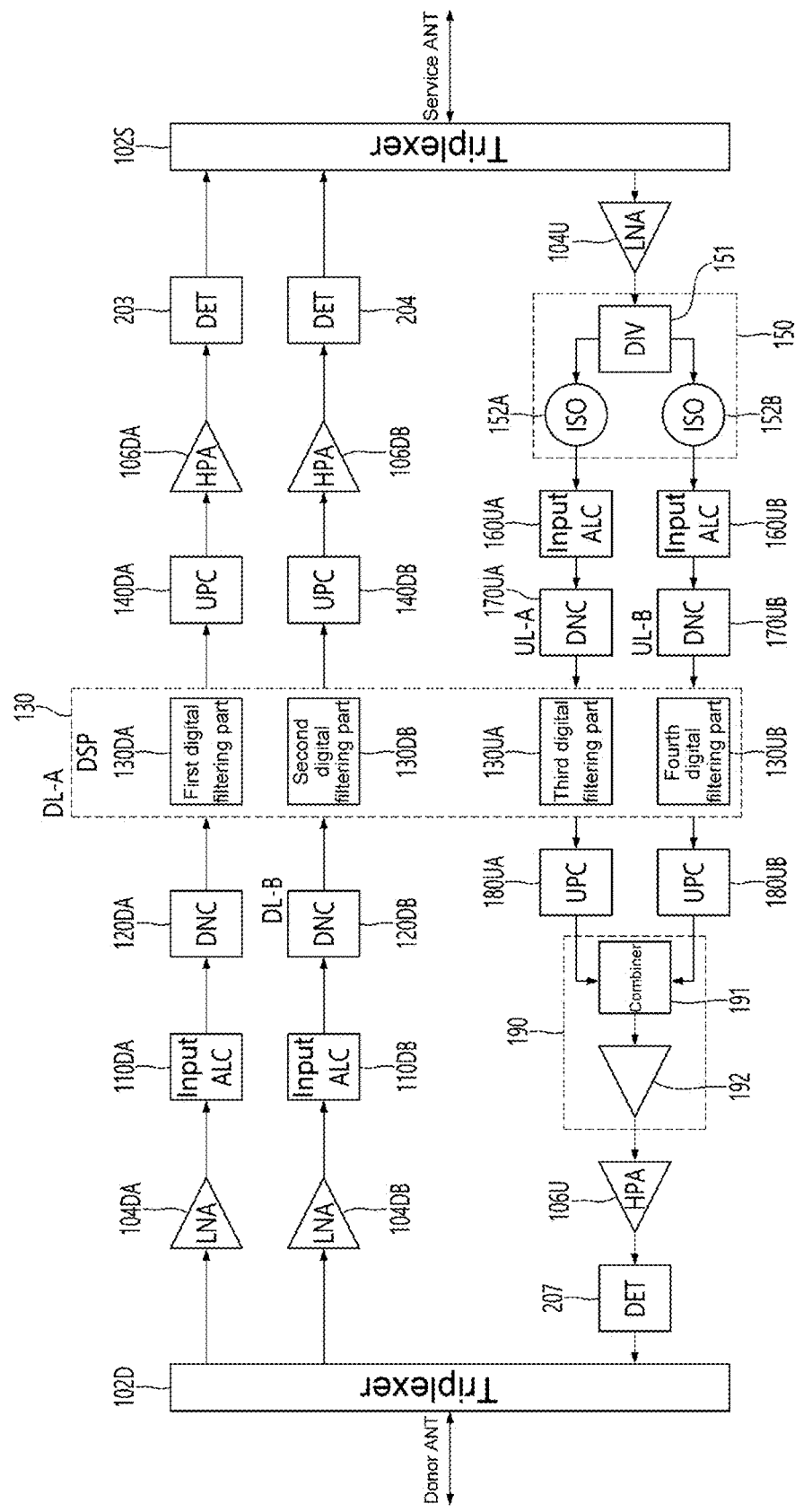
FIG. 2 is a block diagram illustrating a configuration of a signal booster according to an embodiment of the present invention.

As illustrated in FIG. 2, the dual-band signal booster 100 according to an embodiment of the present invention includes a donor-antenna-side triplexer 102D, a first band downlink DL-A, a second band downlink DL-B, a service-antenna-side triplexer 102S, an uplink common low-noise amplifier 104U, an uplink distributing part 150, a first band uplink UL-A, a second band uplink UL-B, an uplink combining part 190, and an uplink common high-power amplifier 106U.

The first band downlink DL-A includes a first band downlink low-noise amplifier 104DA, a first band downlink input level limiter (ALC) 110DA, a first band downlink down-converter 120DA, a first digital filtering part 130DA, a first band downlink up-converter 140DA, and a first band downlink high-power amplifier 106DA. The second band downlink DL-B includes a second band downlink low-noise amplifier 104DB, a second band downlink input level limiter (ALC) 110DB, a second band downlink down-converter 120DB, a second digital filtering part 130DB, a second band downlink up-converter 140DB, and a second band downlink high-power amplifier 106DB.

The first band uplink UL-A includes a first band uplink input level limiter (ALC) 160UA, a first band uplink down-converter 170UA, a third digital filtering part 130UA, and a first band uplink up-converter 180UA. The second band uplink UL-B includes a second band uplink input level limiter (ALC) 160UB, a second band uplink down-converter 170UB, a fourth digital filtering part 130UB, and a second band uplink up-converter 180UB.

The uplink distributing part 150 includes a distributor 151 and first and second isolators 152A and 152B. The uplink combining part 190 includes a combiner 191 and a common amplifier 192.

Referring to FIG. 2, the donor-antenna-side triplexer 102D separates and transmits a first band of radio frequency (RF) signal and a second band of RF signal received from the donor antenna 20 to the first band downlink low-noise amplifier 104DA and the second band downlink low-noise amplifier 104DB. Further, the donor-antenna-side triplexer 102D receives, as an input, a combined RF signal, in which a first band of RF signal and a second band of RF signal are combined, from the uplink common high-power amplifier 106U and transmits the same to the donor antenna 20.

The first band downlink low-noise amplifier 104DA amplifies the first band of RF signal received from the donor-antenna-side triplexer 102D to a low-noise level. The second band downlink low-noise amplifier 104DB amplifies the second band of RF signal received from the donor-antenna-side triplexer 102D to a low-noise level.

The first band downlink input level limiter (ALC) 110DA limits an analog level of the first band of RF signal input from the first band downlink low-noise amplifier 104DA. The second band downlink input level limiter (ALC) 110DB limits an analog level of the second band of RF signal input from the second band downlink low-noise amplifier 104DB. Thus, the level of each signal to be input to an analog-to-digital converter becomes not equal to or greater than a predetermined level.

The first band downlink down-converter 120DA receives, as an input, the first band of RF signal from the first band downlink input level limiter 110DA and converts the same into a first intermediate frequency (IF) signal. The second band downlink down-converter 120DB receives, as an input, the second band of RF signal from the second band downlink input level limiter 110DB and converts the same into a second intermediate frequency (IF) signal.

The first digital filtering part 130DA digitally filters the first intermediate frequency signal provided from the first band downlink down-converter 120DA into a first preset class of channel. The second digital filtering part 130DB digitally filters the second intermediate frequency signal provided from the second band downlink down-converter 120DB into a second preset class of channel.

The first band downlink up-converter 140DA converts the digitally-filtered first intermediate frequency signal into the first band of RF signal. The second band downlink up-converter 140DB converts the digitally-filtered second intermediate frequency signal into the second band of RF signal.

The first band downlink high-power amplifier 106DA amplifies the first band of RF signal, which has been up-converted by the first band downlink up-converter 140DA, to a high-power level. The second band downlink high-power amplifier 106DB amplifies the second band of RF signal, which is up-converted by the second band downlink up-converter 140DB, to a high-power level.

The service-antenna-side triplexer 102S transmits the first band of RF signal input from the first band downlink high-power amplifier 106DA and the second band of RF signal input from the second band downlink high-power amplifier 106DB to the respective service antennas. Further, the service-antenna-side triplexer 102S receives a combined RF signal, in which the first band of RF signal and the second band of RF signal are combined, from the service antennas and transmits the same to the common low-noise amplifier 104U.

The common low-noise amplifier 104U amplifies the combined RF signal received from the service-antenna-side triplexer 102S to a low-noise level. The uplink distributing part 150 separates the combined RF signal, which has been amplified to a low-noise level by the common low-noise amplifier 104U, into the first band of RF signal and the second band of RF signal.

The first band uplink input level limiter (ALC) 160UA limits an analog level of the first band of RF signal input from the uplink distributing part 150. The second band uplink input level limiter (ALC) 160UB limits an analog level of the second band of RF signal input from the uplink distributing part 150. Thus, the level of each signal to be input to an analog-to-digital converter becomes not equal to or greater than a predetermined level.

The first band uplink down-converter 170UA down-converts the first band of RF signal, which is input from the first band uplink input level limiter 160UA, into the first intermediate frequency signal. The second band uplink down-converter 170UB down-converts the second band of RF signal, which is input from the second band uplink input level limiter 160UB, into the second intermediate frequency signal.

The third digital filtering part 130UA digitally filters the first intermediate frequency signal provided from the first band uplink down-converter 170UA to the first set class of channel. The fourth digital filtering part 130UB digitally filters the second intermediate frequency signal provided from the second band uplink down-converter 170UB to a second set class of channel.

Preferably, each of the first digital filtering part 130DA, the second digital filtering part 130DB, the third digital filtering part 130UA, and the fourth digital filtering part 130UB may be configured to include an analog-to-digital converter (ADC) that converts an analog signal input thereto to a digital signal, a digital signal processor (DSP), and a digital-to-analog converter (DAC). The digital signal processor (DSP) may be connected to a microcontroller unit (MCU) via an internal bus as will be described later.

The first band uplink up-converter 180UA converts the first intermediate frequency signal, which is filtered by the third digital filtering part 130UA, into the first band of RF signal. The second band uplink up-converter 180UB converts the second intermediate frequency signal, which is filtered by the fourth digital filtering part 130UB, into the second band of RF signal.

The uplink combining part 190 combines and amplifies the first band of RF signal and the second band of RF signal, which are respectively up-converted by the first band uplink up-converter 180UA and the second band uplink up-converter 180UB. The uplink common high-power amplifier 106U amplifies the RF signal combined at the uplink combining part 190 to a high-power level.

More specifically, each of the first band downlink input level limiter 110DA, the second band downlink input level limiter 110DB, the second band uplink input level limiter 160UA, and the second band uplink input level limiter 160UB is an analog level controlling part which includes an amplifier and a variable attenuator installed on front and rear stages of the amplifier and continuously monitors a signal input thereto to limit an excessive input signal. Thus, the level of the signal to be input to the analog-to-digital converter becomes not equal to or higher than a predetermined level. That is, each of the first band downlink input level limiter 110DA, the second band downlink input level limiter 110DB, the second band uplink input level limiter 160UA, and the second band uplink input level limiter 160UB is provided to protect the ADC and the DSP configured to realize the digital filtering part, from the excessive input signal.

Figure 7:
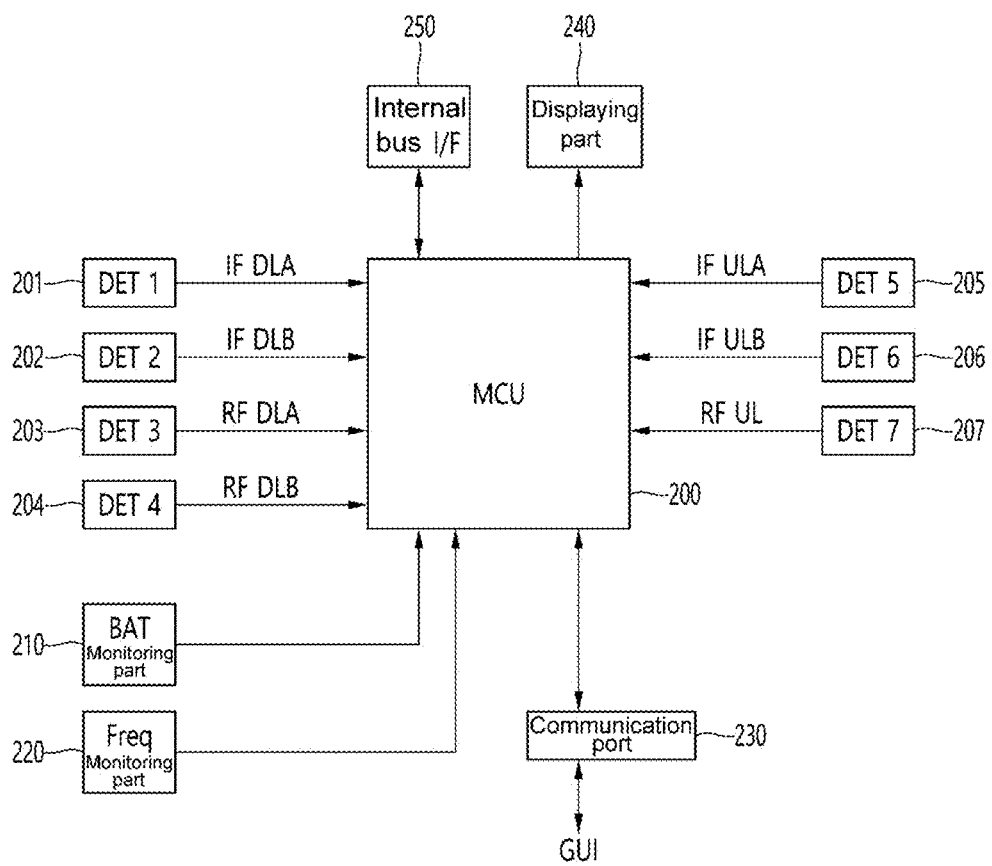
FIG. 7 depicts a schematic drawing illustrating a control configuration of the signal booster according to an embodiment of the present invention.

The outputs of the first band downlink high-power amplifier 106DA, the second band downlink high-power amplifier 106DB and the uplink common high-power amplifier 106U illustrated in FIG. 2 are coupled and detected by respective IF detecting parts (DETs) 203,204 and 207 and then transmitted to a microcontrol unit (MCU) 200 illustrated in FIG. 7. Thus, the microcontrol unit 200 can monitor the operational state.

Figure 3:
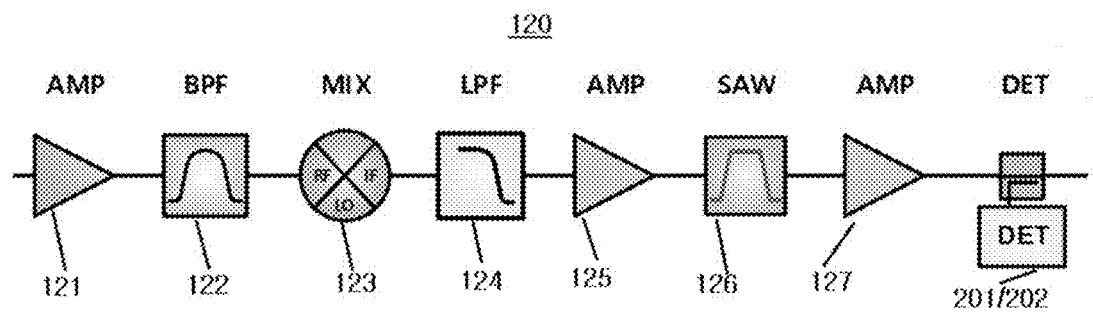
FIG. 3 is a block diagram illustrating a detailed configuration of a downlink down-converter illustrated in FIG. 2.

FIG. 3 is a block diagram illustrating a detailed configuration of the downlink down-converter used in an embodiment of the present invention.

As illustrated in FIG. 3, the downlink down-converter (DNC) 120 includes an RF amplifier 121, an RF band-pass filter 122, a mixer 123, a low-pass filter 124, an IF amplifier 125, an IF band-pass filter 126, an IF amplifier 127, an IF detecting part 201 (or 202), and down-converts a high frequency band of input RF signal into a IF signal which belongs to relatively lower intermediate frequency band.

Referring to FIG. 3, the RF amplifier 121 amplifies the first band (or the second band) of RF signal input thereto. The RF band-pass filter 122 performs a band-pass filtering process (BPF) on the first band (or the second band) of RF signal, which is amplified by the RF amplifier 121, to remove noise.

The mixer 123 mixes an oscillation signal generated from a local oscillator (Local Osc) (not illustrated) with the first band (or the second band) of RF signal, and outputs intermediate frequency signals which belong to upper and lower bands from the mixed signal. The low-pass filter 124 passes only the intermediate frequency signal belonging to the lower band therethrough.

The IF amplifier 125 primarily amplifies the intermediate frequency signal belonging to the lower band. The IF band-pass filter 126 filters the intermediate frequency signal to remove noise. Thereafter, the IF amplifier 127 secondarily amplifies the intermediate frequency signal passed through the IF band-pass filter 126. The IF detecting part 201 (or 202) couples and detects the secondarily-amplified intermediate frequency signal and transfers the same to the microcontroller unit 200.

Figure 4:
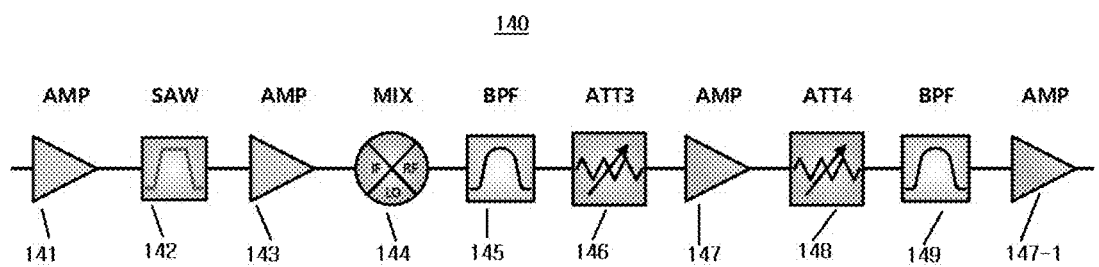
FIG. 4 is a block diagram illustrating a detailed configuration of a downlink up-converter illustrated in FIG. 2.

FIG. 4 is a block diagram illustrating a detailed configuration of the downlink up-converter used in an embodiment of the present invention.

As illustrated in FIG. 4, the downlink up-converter (UPC) 140 includes an IF amplifier 141, a band-pass filter 142, an IF amplifier 143, a mixer 144, a band-pass filter 145, an attenuator 146, an RF amplifier 147, an attenuator 148, a band-pass filter 149, and an RF amplifier 147-1, and converts the IF signal processed by the digital filtering part into a high-frequency RF signal.

Referring to FIG. 4, the IF amplifier 141 primarily amplifies the first band (or the second band) of intermediate frequency signal, which is filtered by the digital filtering part. The band-pass filter 142 filters the primarily-amplified intermediate frequency signal to remove noise. The IF amplifier 143 secondarily amplifies the first band (or the second band) of intermediate frequency signal, which is band-filtered by the band-pass filter 142.

The mixer 144 mixes an oscillation signal generated from a local oscillator (Local Osc) (not illustrated) with the first band (or the second band) of intermediate frequency signal and outputs intermediate frequency signals which belong to upper and lower bands from the mixed signal. The band-pass filter 145 passes the intermediate frequency signal belonging to the upper band and blocks the intermediate frequency signal belonging to the lower band, thereby outputting the first band (or the second band) of RF signal. The attenuator 146 regulates a level of the first band (or the second band) of RF signal, which is filtered by the band-pass filter 145. The RF amplifier 147 primarily amplifies the first band (or the second band) of RF signal whose level is regulated. The attenuator 148 regulates a level of the primarily-amplified RF signal. The band-pass filter 149 performs a band-pass filtering on the first band (or the second band) of RF signal whose level is regulated. The RF amplifier 14 7-1 secondarily amplifies the first band (or the second band) of RF signal, which is band-filtered by the band-pass filter 149.

Figure 5:
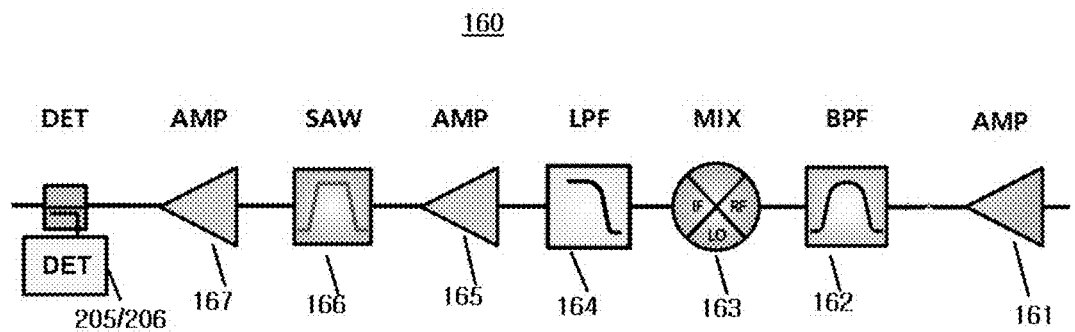
FIG. 5 is a block diagram illustrating a detailed configuration of an uplink down-converter illustrated in FIG. 2.

FIG. 5 is a block diagram illustrating a detailed configuration of the uplink down-converter used in an embodiment of the present invention.

As illustrated in FIG. 5, the uplink down-converter 160 includes an RF amplifier 161, an RF band-pass filter 162, a mixer 163, a low-pass filter 164, an IF amplifier 165, an IF band-pass filter 166, an IF amplifier 167, an IF detecting part 205 (or 206), and down-converts a high frequency band of RF signal received from the service antennas into a relatively low intermediate frequency band of IF signal.

Referring to FIG. 5, the RF amplifier 161 amplifies the first band (or the second band) of RF signal input thereto. The RF band-pass filter 162 performs a band-pass filtering (BPF) on the first band (or the second band) of RF signal, which is amplified by the RF amplifier 161, to remove noise.

The mixer 163 mixes an oscillation signal generated from a local oscillator (Local Osc) (not illustrated) with the first band (or the second band) of RF signal, and outputs intermediate frequency signals which belong to upper and lower bands from the mixed signal. The low-pass filter 164 passes only the intermediate frequency signal belonging to the lower band.

The IF amplifier 165 primarily amplifies the intermediate frequency signal belonging to the lower band, which is passed through the low-pass filter 164. The IF band-pass filter 166 filters the primarily-amplified intermediate frequency signal to remove noise. Thereafter, the IF amplifier 167 secondarily amplifies the intermediate frequency signal, which is band-filtered by the IF band-pass filter 166. The IF detecting part 205 (or 206) couples and detects the secondarily-amplified intermediate frequency signal and transmits the same to the microcontroller unit 200.

Figure 6:
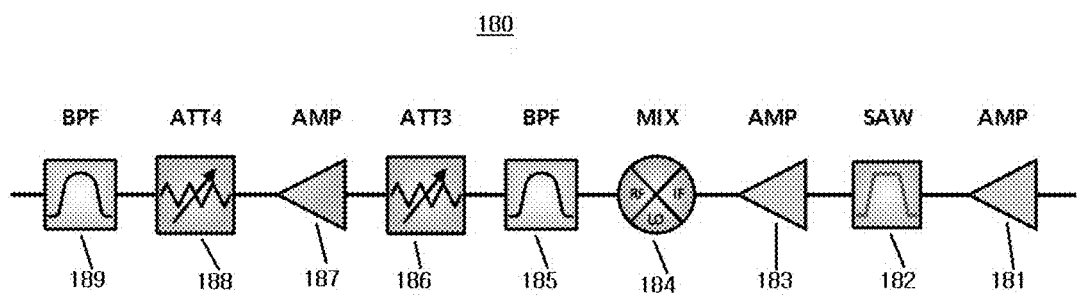
FIG. 6 is a block diagram illustrating a detailed configuration of an uplink up-converter illustrated in FIG. 2.

FIG. 6 is a block diagram illustrating a detailed configuration of the uplink upconverter used in an embodiment of the present invention.

As illustrated in FIG. 6, the uplink up-converter 180 includes an IF amplifier 181, a band-pass filter 182, an IF amplifier 183, a mixer 184, a band-pass filter 185, an attenuator 186, an RF amplifier 187, an attenuator 188, and a band-pass filter 189, and converts the intermediate frequency signal for uplink, which is processed by the digital filtering part, into a high frequency of RF signal.

Referring to FIG. 6, the IF amplifier 181 primarily amplifies the first band (or the second band) of intermediate frequency signal, which is filtered by the digital filtering part. The band-pass filter 182 filters the primarily-amplified intermediate frequency signal to remove nose. The IF amplifier 183 secondarily amplifies the first band (or the second band) of intermediate frequency signal, which is band-filtered by the band-pass filter 182.

The mixer 184 mixes an oscillation signal generated from a local oscillator (Local Osc) (not illustrated) with the first band (or the second band) of intermediate frequency signal, and outputs intermediate frequency signals which belong to upper and lower bands from the mixed signal. The band-pass filter 185 passes the intermediate frequency signal belonging to the upper band and blocks the intermediate frequency signal belonging to the lower band, thereby outputting the first band (or the second band) of RF signal. The attenuator 186 regulates a level of the first band (or the second band) of RF signal, which is band-filtered by the band-pass filter 185. The RF amplifier 187 amplifies the first band (or the second band) of RF signal whose level is regulated. The attenuator 188 regulates the level of the amplified RF signal. The band-pass filter 189 performs a band-pass filtering on the first band (or the second band) of RF signal whose level is regulated.

FIG. 7 depicts a schematic drawing illustrating a control configuration of the signal booster according to an embodiment of the present invention.

As illustrated in FIG. 7, in the dual-band signal booster 100 according to an embodiment of the present invention, the microcontroller unit 200 is coupled to the digital signal processor 130 via an internal bus interface 250 and is coupled to a graphic user interface (GUI) of an external host device via a communication port 230 so as to let the user set characteristics of channels of a digital filter, an alarm level and the like. Upon completion of the setting, the microcontroller unit 200 may receive detection signals from first to seventh IF detecting parts 201 to 207, a battery monitoring part 210, and a frequency monitoring part 220 during a normal operation to monitor an operational state, and may control a displaying part 240 to display the operational state thereon.

Referring to FIG. 7, the first IF detecting part 201 is installed in the first band downlink down-converter 120DA to detect an intermediate frequency signal (IF DLA) in the first band downlink. The second IF detecting part 202 is installed in the second band downlink down-converter 120DB to detect an intermediate frequency signal (IF DLB) in the second band downlink.

The third IF detecting part 203 detects a high-frequency of RF signal (RFDLA)from the first band downlink high-power amplifier 106DA. The fourth IF detecting part 204 detects a high-frequency of RF output (RF DLB) from the second band downlink high-power amplifier 106DB.

The fifth IF detecting part 205 is installed in the first band uplink down-converter 170UA to detect an intermediate frequency signal (IF ULA) in the first band uplink. The sixth IF detecting part 206 is installed in the second band uplink down-converter 170UB to detect an intermediate frequency signal (IF ULB) in the second band uplink. The seventh IF detecting part 207 detects a combined band of uplink RF output (RF UL) from the uplink common high-power amplifier 106U.

The battery monitoring part 210 may be configured to detect a voltage of a battery module and monitor a charge stage of the battery. The frequency monitoring part 220 monitors a frequency, such as an oscillation frequency. The displaying part 240 can have a plurality of light emitting diodes (LEDs) and displays the operational state thereon.

Figure 8:
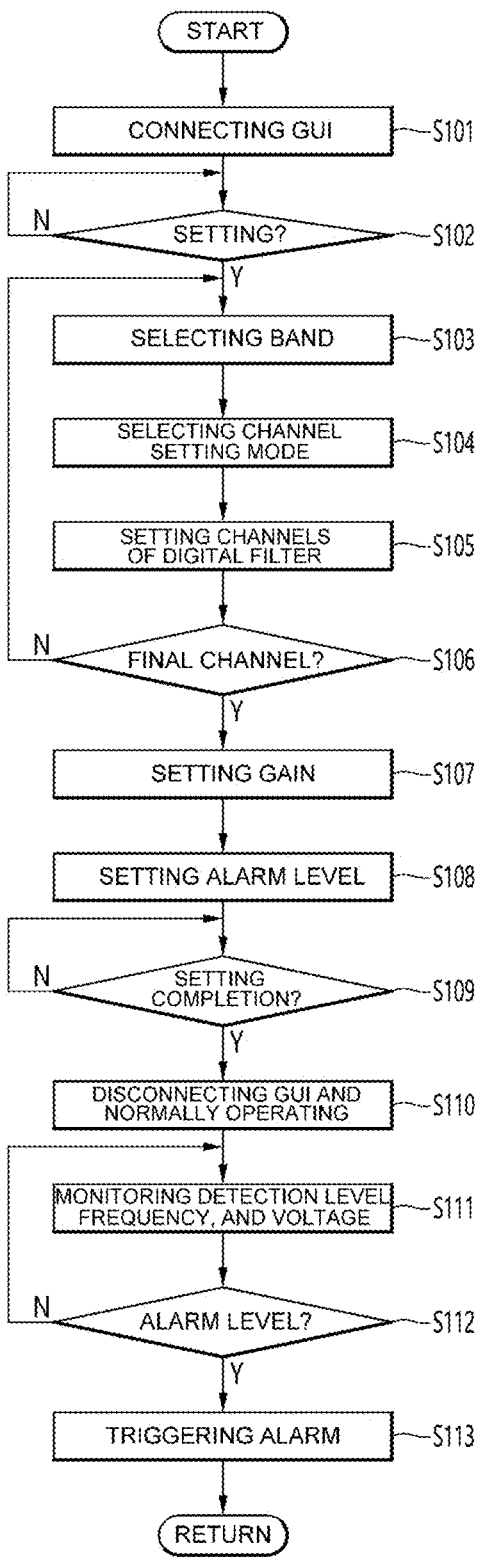
FIG. 8 is a flowchart for explaining an operation procedure of the signal booster according to an embodiment of the present invention.

FIG. 8 is a flowchart for explaining an operation procedure of the signal booster according to an embodiment of the present invention, and FIG. 9 depicts an example of a malfunction detection level according to an embodiment of the present invention.

As illustrated in FIG. 8, the dual-band signal booster 100 according to an embodiment of the present invention may be connected to the GUI after installation to let the user set the characteristics of the channels of the digital filter, the alarm level, and the like.

Referring to FIG. 8, after installation, the GUI can be executed by connecting to a notebook computer, on which an operational program is installed, through the communication port 230 (S101).

Once a channel setting is selected through the GUI, a band selection and a channel mode are selected, and then a frequency and bandwidth of each channel of the digital filter are set (S102 to S105).

Upon completion of the settings for all the channels, a gain and an alarm level are set. When all the settings are completed, the notebook computer can be disconnected from the communication port 230, and the dual-band signal booster 100 normally operates (S106 to 5110).

The detection level, the frequency, the voltage, and the like are monitored by the first to seventh IF detecting parts 201 to 207, the monitoring parts 210 and 220, and the like during a normal operation. When the level reaches the alarm level during the monitoring operation, an alarm is triggered and is displayed on the displaying part 240 (S111 to S113).

In an embodiment of the present invention, each channel of the digital filter may be configured to be selectively set to have the first band or the second band. In each band, a channel setting mode may be separately set to a class mode A and a class mode B.

The class mode A of the first band may perform setting to one channel "First NET" and a narrow-band of 32 channels. The First NET channel is fixed at a bandwidth of 10 MHz and a set frequency thereof is also fixed.

The narrow-band of 32 channels may be set to have one to 32 channels in a simultaneous manner The bandwidth of each channel is variable as follows. That is, the bandwidths of the narrowband channels may be set to 12.5 KHz, 25 KHz, 50 KHz, 75 KHz, 100 KHz, and 150 KHz. The channels may be set to have different bandwidths and different frequencies.

The class mode B of the first band may be set to one channel "First NET" and a wide-band of three channels. In the class mode B, the bandwidth of the First NET channel may also be variably set to 250 KHz, 500 KHz, 1 MHz, 2 MHz, 3 MHz, 7 MHz, and 10 MHz and frequencies thereof may also be variably set.

The wide-band of three channels may be set to have one to three channels in a simultaneous manner The bandwidth of each channel may be set variably to 250 KHz, 500 KHz, 1 MHz, 2 MHz, 3 MHz, and 7 MHz. In addition, the wide-band channels may be set to have different bandwidths and different frequencies.

The class mode A of the second band may have the narrow-band of 32 channels which may be set to have one to 32 channels in a simultaneous manner The bandwidth of each channel may be variably set to 12.5 KHz, 25 KHz, 50 KHz, 75 KHz, 100 KHz, or 150 KHz. In addition, each of the 32 channels may be set to have different bandwidths and different frequencies.

The class mode B of the second band may have a wide-band of 4 channels. In this case, the bandwidth of the first channel may be variably set to 250 KHz, 500KHz, 1

MHz, 2 MHz, 3 MHz, 7 MHz, or 10 MHz, and the frequency thereof may also be variably set.

The second channel to the fourth channel may be set to have one to three channels in a simultaneous manner The bandwidth of each channel may be variably set to 250 KHz, 500 KHz, 1 MHz, 2 MHz, 3 MHz, or 7 MHz.

In addition, the second channel to the fourth channel may be set to have different bandwidths and different frequencies.

Referring back to FIG. 8, upon completion of the channel setting, the gain and the alarm level may be set.

As illustrated in FIG. 9, the setting of the alarm level may include setting a squelch threshold. In an embodiment of the present invention, the range of sensitivity margin (TBD dB) is set with reference to the minimum power detection sensitivity. When a detection level falls within this range, it is determined that the donor antenna is disconnected from the dual-band signal booster 100. The range of 10 dB with reference to the squelch threshold is defined as the section "False Failure Headroom". When a detection level is between the upper limit of the sensitivity margin and the lower limit of the false failure headroom, it is determined that the donor antenna is malfunctioned.

Here, the squelch function has a function of continuously monitoring a signal input to a signal booster through individual channels (32 channels) of a digital filter, turning off the respective channel when a level of the input signal is equal to or smaller than a set level (−60 to −90 dBm), and turning on the respective channel when the level of the input signal is equal to or higher than the set level. With this function, by turning off the channel to which no signal is input, it is possible to prevent unnecessary consumption of electric power, which can be referred to as a power saving function.

The determining that the donor antenna is malfunctioned includes issuing an alarm when the level of the input signal becomes equal to or smaller than the set level due to the disconnection of the communication line or the failure of the signal booster or the like while continuously monitoring the input signal.

What is claimed is:

1. A dual-band signal booster for a public safety radio network, comprising:
   a donor-antenna-side triplexer configured to separate and transmit a first band of radio frequency (RF) signal and a second band of radio frequency signal, which are received from a donor antenna, to a service antenna side, and configured to transmit a combined radio frequency signal, which is obtained by combining the first band of radio frequency signal with the second band of radio frequency signal, to the donor antenna;
   a first band downlink configured to perform a low-noise amplification and a frequency down/up conversion on the first band of radio frequency signal received from the donor-antenna-side triplexer, amplify the amplified and converted signal to a high-power level, and transmit the amplified signal to the service antenna;
   a second band downlink configured to perform a low-noise amplification and a frequency down/up conversion on the second band of radio frequency signal received from the donor-antenna-side triplexer, amplify the amplified and converted signal to a high-power level, and transmit the amplified signal to the service antenna;
   a service-antenna-side triplexer configured to transmit the first band of radio frequency signal input from the first band downlink and the second band of radio frequency signal input from the second band downlink to the service antenna, and configured to receive the combined radio frequency signal in which the first band of RF signal and the second band of RF signal are combined from the service antenna;
   a common low-noise amplifier configured to amplify the combined radio frequency signal received from the service-antenna-side triplexer to a low-noise level;
   an uplink distributor configured to separately distribute the combined radio frequency signal, which is amplified to the low-noise level by the common low-noise amplifier, into the first band of radio frequency signal and the second band of radio frequency signal;
   a first band uplink configured to perform the frequency down/up conversion on the first band of radio frequency signal distributed from the uplink distributor;
   a second band uplink configured to perform the frequency down/up conversion on the second band of radio frequency signal distributed from the uplink distributor;
   an uplink combiner configured to combine the first band of radio frequency signal and the second band of radio frequency signal whose frequencies are up-converted, and
   a common high-power amplifier configured to amplify the combined radio frequency signal combined at the uplink combiner to a high-power level, and transmit the amplified combined radio frequency signal to the donor-antenna-side triplexer.

2. The dual-band signal booster for a public safety radio network of claim 1, wherein the first band downlink comprises:
   a first band downlink low-noise amplifier configured to amplify the first band of radio frequency signal received from the donor-antenna-side triplexer to low-noise level;
   a first band downlink input level limiting means configured to limit an analog level of the first band of radio frequency signal input from the first band downlink low-noise amplifier;
   a first band downlink down-converter configured to receive the first band of radio frequency signal from the first band downlink input level limiting means, and convert the same into an intermediate frequency signal;
   a first digital filtering part configured to digitally filter the intermediate frequency signal from the first band downlink down-converter to a first preset class of channel;
   a first band downlink up-converter configured to convert the digitally-filtered intermediate frequency signal into the first band of radio frequency signal; and
   a first band downlink high-power amplifier configured to amplify the first band of radio frequency signal whose frequency is up-converted to high-power level.

3. The dual-band signal booster for a public safety radio network of claim 1, wherein the second band downlink comprises:
   a second band downlink low-noise amplifier configured to amplify the second band of radio frequency signal received from the donor-antenna-side triplexer to low-noise level;
   a second band downlink input level limiting means configured to limit an analog level of the second band of radio frequency signal input from the second band downlink low-noise amplifier;
   a second band downlink down-converter configured to receive the second band of radio frequency signal from the second band downlink input level limiting means, and convert the same into an intermediate frequency signal;

a second digital filtering part configured to digitally filter the intermediate frequency signal from the second band downlink down-converter to a second preset class of channel;

a second band downlink up-converter configured to convert the digitally-filtered intermediate frequency signal into the second band of radio frequency signal; and a second band downlink high-power amplifier configured to amplify the second band of radio frequency signal whose frequency is up-converted to high-power level.

4. The dual-band signal booster for a public safety radio network of claim 1, wherein the first band uplink comprises:

a first band uplink down-converter configured to down-convert the first band of radio frequency signal distributed from the uplink distributor to an intermediate frequency signal;

a third digital filtering part configured to digitally filter the intermediate frequency signal from the first band uplink down-converter into a first preset class of channel; and a first band uplink up-converter configured to convert the digitally-filtered intermediate frequency signal into the first band of radio frequency signal.

5. The dual-band signal booster for a public safety radio network of claim 1, wherein the second band uplink comprises:

a second band uplink down-converter configured to down-convert the second band of radio frequency signal distributed from the uplink distributor to an intermediate frequency signal;

a fourth digital filtering part configured to digitally filter the intermediate frequency signal from the second band uplink down-converter into a second preset class of channel; and a second band uplink up-converter configured to convert the digitally-filtered intermediate frequency signal into the second band of radio frequency signal.

* * * * *